United States Patent [19]

Fackelman

[11] Patent Number: 4,578,103
[45] Date of Patent: Mar. 25, 1986

[54] GLASS SHEET PROCESSING SYSTEM INCLUDING TOPSIDE TRANSFER APPARATUS

[75] Inventor: Lee E. Fackelman, Perrysburg, Ohio

[73] Assignee: Glasstech, Inc., Perrysburg, Ohio

[21] Appl. No.: 674,083

[22] Filed: Nov. 23, 1984

[51] Int. Cl.[4] .................... C03B 23/025; C03B 23/03; C03B 23/035
[52] U.S. Cl. .................... 65/182.2; 65/106; 65/273; 65/287
[58] Field of Search .................... 65/106, 287, 182.2, 65/273

[56] References Cited

U.S. PATENT DOCUMENTS 3,223,443 12/1965 Misson .................... 65/182.2
3,468,645 9/1969 McMaster et al. .................... 65/273

FOREIGN PATENT DOCUMENTS 2251408 10/1971 Fed. Rep. of Germany ..... 65/182.2

Primary Examiner—Arthur Kellogg
Attorney, Agent, or Firm—Brooks & Kushman

[57] ABSTRACT

A glass sheet processing system including topside transfer apparatus (12) for transferring glass sheets during processing. The transfer apparatus (12) supports glass sheets at a downwardly facing surface (36) by a vacuum drawn through a first set of holes (38) in the surface and by pressurized gas supplied through a second set of holes (40) in the surface. The topside transfer apparatus (12) has particular utility when utilized in a glass sheet forming system (10, 10') to transfer a heated glass sheet from a heating conveyor to a curved mold for forming. In addition, the topside handling apparatus has other uses such as conveying glass sheets during heating prior to processing, supporting a heated glass sheet on a deformable platen for forming, and loading a glass sheet onto a conveyor for processing.

15 Claims, 18 Drawing Figures

GLASS SHEET PROCESSING SYSTEM INCLUDING TOPSIDE TRANSFER APPARATUS

TECHNICAL FIELD

This invention relates to glass sheet processing systems and has particular utility in forming heated glass sheets as well as loading glass sheets for processing and conveying glass sheets.

BACKGROUND ART

U.S. Pat. No. 3,223,443 of George W. Misson discloses a method and apparatus for handling a flat or curved heated glass sheet without physical contact between the glass sheet and a downwardly facing support bed. The apparatus of the Misson patent is merely disclosed as supporting a glass sheet without any disclosure of specific utility in any glass sheet processing operation. Only relatively small glass sheet samples, e.g. 4 inches square, were supported by the Misson apparatus after being placed in position by hand which clearly indicates the apparatus was merely experimental without any industrial application.

One embodiment of the Misson patent apparatus includes inverted cup shaped modules that are spaced from each other to establish pressure and exhaust zones adjacent the top surface of the glass sheet to be supported. This establishes flows of gas to and from the zones directly above the glass sheet at a location between the glass sheet and the support bed. Control of the rates at which the gas is emitted and exhausted differentially establishes a net pressure directly above the glass sheet that is less than the ambient pressure by an amount equal to the weight of the sheet. The support bed supports either unheated glass sheets or glass sheets which have been preheated to a deformation temperature. The glass sheet may be initially supported beneath the bed on a flat, uniform preheated surface. Thereafter, the physical support for the glass sheet is removed.

Another embodiment of the Misson patent apparatus includes a support bed having a porous bottom plate through which gas under pressure is supplied. Tubes that extend through the porous plate provide for the withdrawal of gas to reduced the pressure above the glass sheet.

U.S. Pat. No. 4,282,026 of Harold A. McMaster, Norman C. Nitschke, and John S. Nitschke discloses apparatus for bending glass sheets wherein a heated glass sheet is received from a horizontal conveyor by a downwardly facing surface of a vacuum holder and is thereafter deposited by the holder onto a curved mold on which bending of the heated glass sheet takes place. A differential gas pressure preferably provided by a vacuum drawn through holes at the downwardly facing surface secures the glass sheet to the holder as it is moved from the conveyor to the bending mold. A sheet-like cover is provided on the surface and has a porous construction, such as is provided by matted silica fibers, in order to distribute the vacuum and prevent marring and scratching of the heated glass sheet surface engaged by the holder.

U.S. Pat. No. 4,111,676 of Charles H. Mechling et al discloses glass sheet tempering performed on a roller conveyor between upper and lower arrays of nozzles through which quenching gas is supplied. In addition to lower rolls provided for conveying the glass sheets during the tempering, upper hold-down rolls are provided in case the quenching gas supplied by the lower nozzles lifts the glass sheet being tempered upwardly off the lower conveyor rolls. Driving of the upper hold-down rolls is also provided to perform conveyance of a glass sheet lifted off the conveyor rolls by the quenching gas from the lower nozzles.

DISCLOSURE OF THE INVENTION

An object of the present invention is to provide improved apparatus for providing topside handling of glass sheets. In carrying out this object, the apparatus includes a heating conveyor for conveying a glass sheet for heating and a topside transfer platen that receives the heated glass sheet from the heating conveyor and provides support thereof from above without surface to surface contact. The apparatus is used to transfer the heated glass sheet for further processing and has particular utility when utilized to deposit a heated glass sheet on a curved mold for forming. In addition, the manner in which the glass sheet is supported from above without contact allows movement of the glass sheets for loading onto a conveyor, which is particularly desirable when a glass sheet having a painted upper surface is loaded onto a roller conveyor. Furthermore, the topside apparatus is disclosed as providing glass sheet conveyance which has particular utility with heated glass sheets. Also, the topside apparatus provides accurate positioning of supported glass sheets against positioners in a manner that has not been heretofore possible.

The glass sheet topside transfer platen of the invention includes a downwardly facing surface having a first set of holes through which a vacuum is drawn to support a heated glass sheet received from the heating conveyor. The transfer platen surface has a second set of holes through which pressurized gas is supplied to space the glass sheet from the surface. The extent of the vacuum drawn and the gas pressure utilized cooperatively control the spacing between the glass sheet and the platen surface. Such a construction allows the heated glass sheet to be supported without any direct engagement that could cause marring or scratching of the heated upper glass surface. Also, the glass sheet is disclosed as being moved horizontally along the surface to provide horizontal conveyance and/or accurate horizontal positioning.

The downwardly facing surface is disclosed as having a planar shape to permit topside support of flat glass sheets by the apparatus. The transfer platen is made from fused silica which has virtually zero coefficient of thermal expansion and thus maintains its planar shape upon heating without distortion that could cause engagement and marring or scratching of the heated glass surface. First and second sets of passages in the platen are provided with lower ends of the passages respectively connected with the planar surface to provide the first and second sets of holes through which the vacuum is drawn and the pressurized gas is supplied.

The lower ends of the second set of passages in the platen are disclosed as being inclined to provide a preferred means for conveying the glass sheet along the planar surface. Each of two different conveying platen embodiments disclosed includes elongated tunnels for supplying the pressurized gas. One embodiment of the conveying platen has the tunnels extending perpendicular to the direction of the glass sheet conveyance along the planar surface. Another embodiment of the conveying platen has the elongated tunnels extending parallel to the direction of glass sheet conveyance along the planar surface. Both of these conveying platen embodiments have the second set of passages thereof provided with upper ends communicated with the elongated tunnels thereof to provide the supply of pressurized gas that spaces the glass sheet from the planar surface. A further conveying platen embodiment disclosed has the second set of passages inclined toward a central axis of conveyance in opposite directions on each side thereof, and the second set of passages are also inclined in one direction along the axis of conveyance. Such a construction provides centering of the conveyed glass sheets as well as the impetus for horizontal movement along the downwardly facing surface. A suitable movable frame can also be used to assist or provide the conveyance along the planar surface.

When utilized with a heated glass sheet requiring good optical quality, it is important for the second set of holes to supply pressurized gas that is heated to approximately the same temperature as the heated glass sheet to prevent undesired deformation thereof by the pressurized gas. Maintaining the temperature of the pressurized gas no more than about 5 to 10 degrees Centigrade above or below the glass sheet temperature has been found to prevent deformation that affects optical quality even when the glass is heated sufficiently high for tempering.

The apparatus of the invention has particular utility when utilized to provide forming of heated glass sheets. In such usage, the apparatus includes a curved mold for receiving a heated glass sheet from he planar platen surface for forming to the curved shape of the mold. A furnace is utilized for heating the glass sheets to a sufficiently high temperature for forming and includes a horizontal roller conveyor from which each heated glass sheet is received by the downwardly facing platen surface prior to being transferred to the mold for forming.

One glass processing system constructed in accordance with the invention includes a heating conveyor that terminates adjacent the transfer platen and conveys the heated glass sheet at an elevation just below the elevation of the downwardly facing planar surface of the transfer platen. During operation, the transfer platen receives the heated glass sheet from the heating conveyor prior to being released therefrom onto the curved mold by termination of the vacuum drawn through the first set of holes.

Another glass processing system constructed in accordance with the invention has the heating conveyor constructed so as to convey the heated glass sheet to below the planar surface of the transfer platen. An actuator moves the transfer platen downwardly to a first position in proximity with the heating conveyor to facilitate initial support of the glass sheet by the planar surface of the platen. This actuator subsequently moves the transfer platen upwardly to a second position spaced above the conveyor. Thereafter, the curved mold receives the glass sheet from the platen for forming.

Both of the glass processing systems described above are disclosed as including a quench unit having upper and lower opposed blastheads for supplying cooling gas to opposite surfaces of the formed glass sheet to provide cooling thereof that tempers the glass sheet. When the apparatus is utilized in connection with such a quench unit, the transfer conveyor used to transport the formed glass sheet to the quench unit preferably includes a transfer ring having an open center that permits the cooling gas to be supplied to the lower surface of the formed glass sheet from the lower blasthead.

A further embodiment of the topside transfer apparatus includes a conveyor onto which glass sheets are loaded from the downwardly facing platen surface. This loading usage of the apparatus can be performed by vertical and horizontal movement of the platen, tilting movement of the platen, a fixed inclined position of the platen, or inclined gas supply passages as previously described in connection with the forming usage. Regardless of what type of movement is utilized, the topside transfer apparatus has particular utility when utilized to load a glass sheet that is painted such as with manufacturing information and/or a grid pattern for providing defrosting, etc.

A further embodiment of the topside transfer apparatus utilized to perform forming includes a deformable platen that defines the downwardly facing surface. This deformable platen has a first position where the downwardly facing surface has a planar shape to initially receive a heated glass sheet. The deformable platen has a second position where the surface is curved from the planar shape to provide the forming of the glass sheet to the desired shape. An actuator moves the deformable platen between the first and second positions during the forming operation.

In both the forming and loading usages of the topside transfer apparatus, locators are preferably provided for positioning the glass sheet on the platen surface in preparation for being released onto the curved mold, onto the conveyor on which loading is to be provided, or onto any other component on which the glass sheet is to be deposited for whatever type of processing is to be performed.

The objects, features, and advantages of the present invention are readily apparent from the the following detailed description of the best modes for carrying out the invention when taken in connection with the accompanying drawings.

BEST MODES FOR CARRYING OUT THE INVENTION

Figure 1:
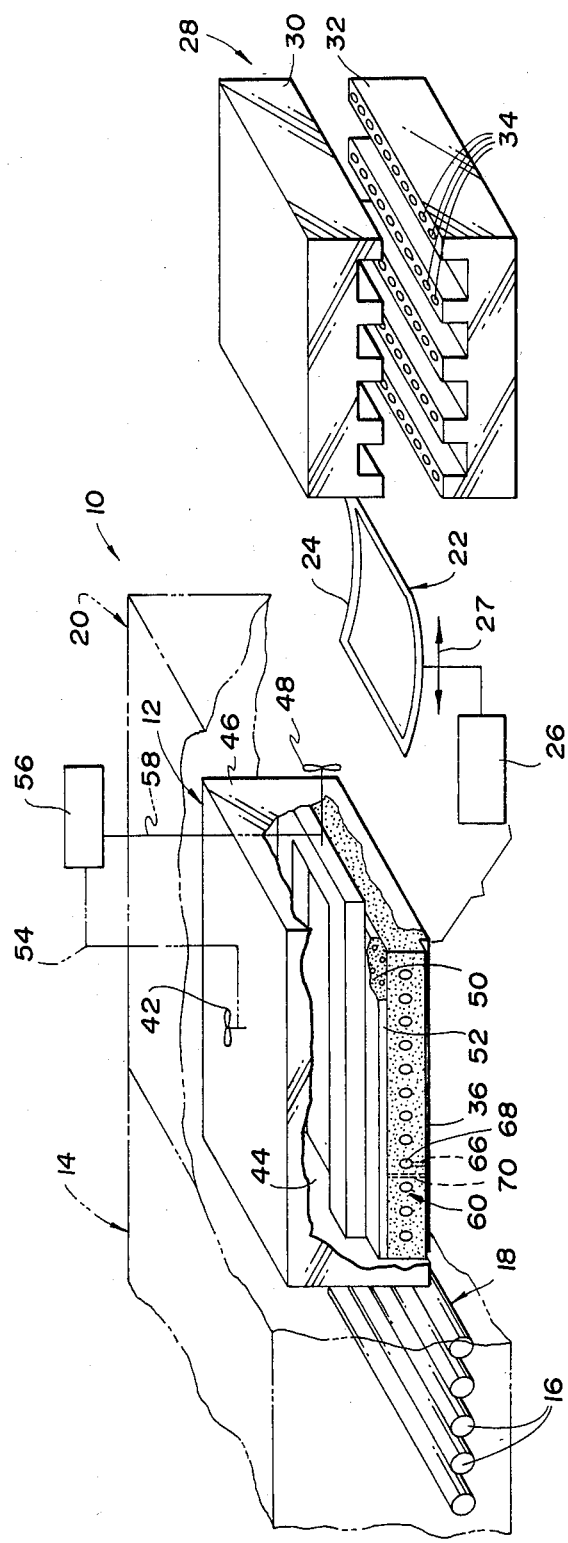
FIG. 1 is a schematic, perspective view of a glass sheet forming and tempering system including topside transfer apparatus constructed in accordance with the present invention.

With reference to FIG. 1 of the drawings, a glass sheet forming and tempering system is generally indicated by reference numeral 10 and includes topside transfer apparatus 12 that is constructed in accordance with the invention to provide handling of heated glass sheets as a part of a processing operation. Heating of glass sheets is performed in a furnace 14 of the system. Conveyance of the glass sheets during heating is performed on rolls 16 of a horizontal heating conveyor 18. The topside transfer apparatus 12 of system 10 is preferably located in a heated ambient such as in the furnace end 20 which is only partially shown. A heated glass sheet is received by the topside transfer apparatus 12 as is hereinafter more fully described and is thereafter deposited by the apparatus on a curved forming mold 22 of the system 10. Mold 22 includes an open center ring 24 that is moved horizontally in opposite directions by an actuator 26 as illustrated by arrows 27. A quench unit 28 of system 10 includes upper and lower opposed blastheads 30 and 32 having nozzles 34 through which quenching gas is supplied to provide tempering of a formed glass sheet positioned within the quench unit by movement of the ring mold 22 under the operation of the actuator 26.

With combined reference to FIGS. 1 through 4, the glass sheet topside transfer apparatus 12 includes a downwardly facing surface 36 for receiving and supporting a glass sheet prior to release thereof onto the mold 22 for forming. A first set of openings or holes 38 in the surface 36 is provided for drawing a vacuum to support a glass sheet below the surface. A second set of openings or holes 40 in the surface 36 supplies pressurized gas at the surface in order to maintain a spaced relationship between the supported glass sheet and the surface. With this construction, the heated glass sheet to be formed can be supported without surface to surface contact such that marring and scratching of the upper glass surface does not take place as the glass sheet is transferred from the conveyor 18 shown in FIG. 1 to the bending mold 22. Except for the holes 38 and 40, the surface 36 has a continuous shape without any abrupt curvature and thereby provides this spaced support by the operation of the vacuum and pressurized gas flows in cooperation with the ambient pressure below the glass sheet.

With reference to FIG. 1, a schematically indicated first vacuum blower 42 is located within the heated ambient and communicated with a vacuum chamber 44 defined by a sheet metal housing 46. Operation of blower 42 draws a vacuum withing the chamber 44 which is communicated with the vacuum holes in order to draw the vacuum at the downwardly facing surface 36 as previously described. Blower 42 delivers the gas drawn from chamber 44 to the heated ambient within furnace end 20 such that there is no heat loss involved with operation of the apparatus. A pressure blower 48 is communicated with a chamber 50 defined by a sheet metal housing 52 within the housing 46. The chamber 50 is communicated with the gas pressure supply holes to supply a downward flow of pressurized gas that maintains a spaced relationship between the supported glass sheet and the surface 36. The blower 48 draws heated gas from within the furnace 14 such that there is no chilling of the upper glass surface by the pressurized gas supplied to the downwardly facing surface 36. A schematically indicated connection 54 from the first vacuum blower 42 to a control unit 56 and a schematically indicated connection 58 of the control unit to the second pressure blower 48 provide coordinated operation of the blowers to control the relative extents of the vacuum and pressurized gas in order to provide the proper spacing between the surface 36 and the supported glass sheet.

Figure 2:
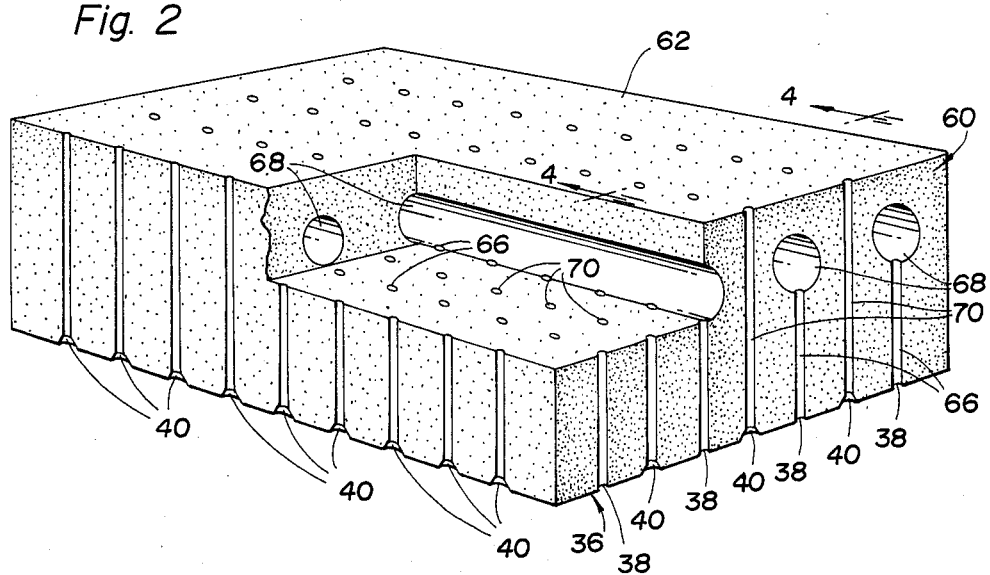
FIG. 2 is a partially broken away perspective view of a refractory platen that defines a downwardly facing surface of the apparatus.
Figure 3:
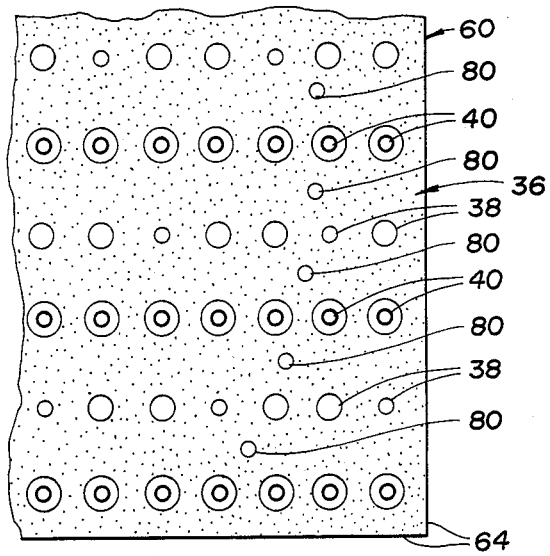
FIG. 3 is a bottom plan view of the refractory platen and illustrates a first set of holes through which a vacuum is drawn and a second set of holes through which pressurized gas is supplied to support a glass sheet below the surface in a spaced relationship.
Figure 4:
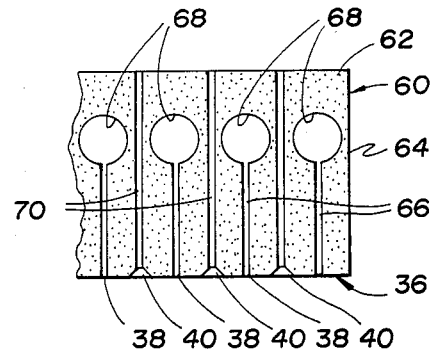
FIG. 4 is a sectional view taken along the direction of line 4—4 in FIG. 2 to illustrate passages that defines the first and second set of holes.

With reference to FIGS. 2, 3 and 4, the downwardly facing surface 36 has a planar shape to receive flat glass sheets for topside support and handling in the manner previously described. When utilized to handle and transfer hot glass sheets, it is preferable for the apparatus to include a refractory platen 60 that defines the downwardly facing planar surface 36. Refractory platen 60 is preferably made from fused silica particles that are sinter bonded so as to have a low coefficient of thermal expansion and hence the ability to maintain planarity upon heating and cooling. An upwardly facing surface 62 of platen 60 extends parallel to its downwardly facing surface 36, while side surfaces 64 extend perpendicular to both surfaces 36 and 62 to define the block like construction.

The platen 60 illustrated in FIGS. 2 and 4 includes a first set of passages 66 having lower ends that define the set of vacuum holes 38 at the surface 36. Upper ends of passages 66 are communicated with elongated tunnels 68 that extend horizontally between one pair of side surfaces 64 to communicate the vacuum drawn in the chamber 44 illustrated in FIG. 1 with the vacuum holes 38.

A second set of passages 70 in the platen 60 illustrated in FIGS. 2 through 4 provides for flow of the pressurized gas to the surface 36 from the chamber 50 illustrated in FIG. 1. Passages 70 are arranged in rows between the tunnels 68 and have upper ends at the upper surface 62 as best seen in FIGS. 2 and 4. Lower ends of the passages 70 have flared shapes that define the second set of holes 40 through which the pressurized gas is supplied to the planar surface 36. Good flow and distribution characteristics are found to result with the flared construction of the lower ends of the pressure passages 70.

Specific parameters of one platen 60 successfully used includes alternating rows of the vacuum and pressure passages 66 and 70 with the rows spaced $\frac{3}{4}$ of an inch apart from each other. Each of the rows of vacuum passages 66 includes passages spaced on $\frac{1}{2}$ inch centers with a pattern of one passage with $\frac{1}{8}$ inch diameter and then two passages with 3/16 inch diameter, such pattern repeating over the entire length of the row. Each of the rows of pressure passages 70 includes passages spaced on $\frac{1}{2}$ inch centers with each passage having an $\frac{1}{8}$ inch diameter flared to $\frac{1}{4}$ inch diameter at the surface 36.

Successful topside transfer of heated glass sheets $\frac{1}{8}$ inch thick was performed by the refractory platen 60 described above by initially drawing a vacuum estimated to be on the equivalent of about 5 inches of water column for the initial pickup during a short time period of about 0.2 seconds. Thereafter, the vacuum drawn was decreased to be equivalent to about $3\frac{1}{2}$ inches of water column. During both the high pressure vacuum pickup and the subsequent support of the heated glass sheet, the pressurized gas supplied was equivalent to about 3 to 5 inches of water column.

Figure 5:
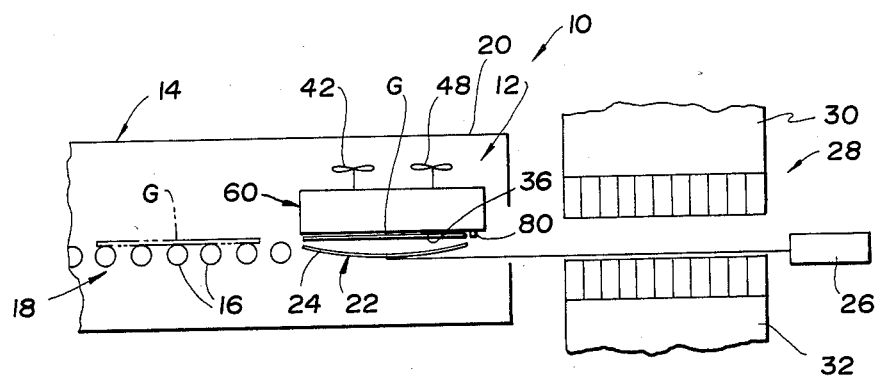
FIG. 5 is a view illustrating the system of FIG. 1 with a curved hold thereof moved under the topside transfer apparatus to receive a heated glass sheet therefrom for forming.

With reference to FIG. 5, the topside transfer apparatus 12 is stationary and its downwardly facing platen surface 36 extending away from the heating conveyor 18. The transfer platen surface 36 is located adjacent and just above the elevation of a glass sheet being conveyed on the rolls 16 of the heating conveyor 18 which does not overlap with the platen 60. After the heating is completed, the glass sheet is conveyed from the phantom line indicated position toward the right to the solid line indicated position as the glass sheet is supported by the vacuum and pressurized gas in the manner previously described. Inertia of the glass sheet moving off of the roller conveyor 18 provides movement thereof into engagement with locators 80 (see also FIG. 3) that position the glass sheet. As is hereinafter more fully described, it is also possible for the pressurized gas supplied to the platen surface 36 to be inclined in order to assist the inertia in conveying the glass sheet into engagement with the locators 80. A suitable mechanical catcher can be moved into position at the downstream end of the glass sheet to prevent it from bouncing off the locators 80 in an upstream direction if this is found to be necessary. It is also possible to utilize a suitable mechanical frame for assisting in conveying the glass sheet into position in engagement with the locators 80 in preparation for the forming operation. Actuator 26 positions the curved mold 22 below the platen surface 36 in preparation for the forming operation.

Figure 6:
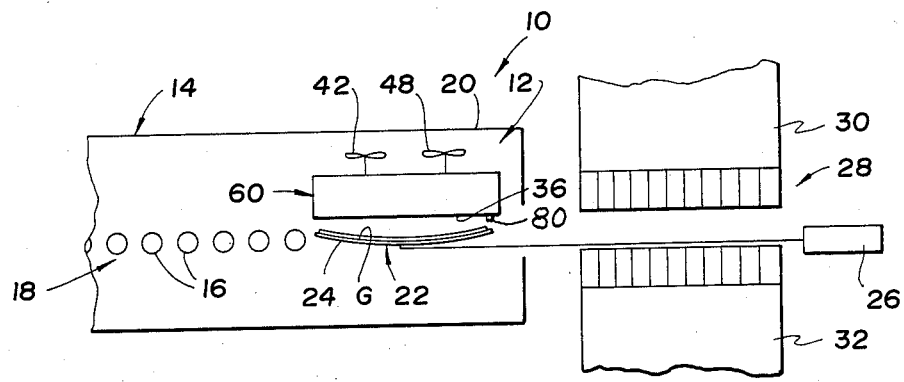
FIG. 6 is a view similar to FIG. 5 showing the glass sheet after it is has been released onto the mold for forming.
Figure 7:
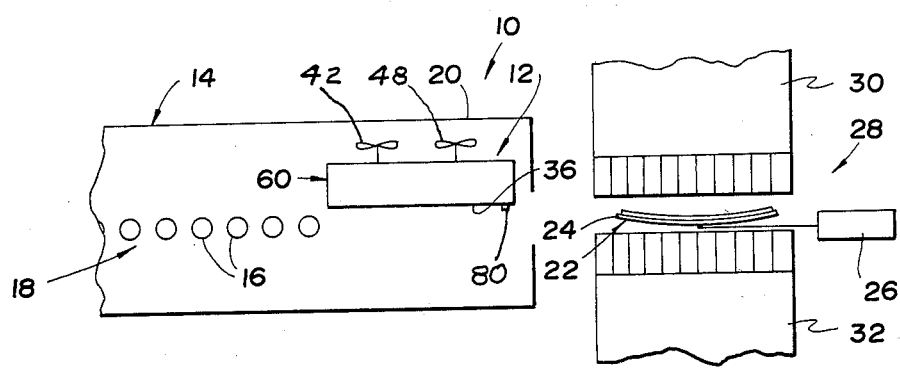
FIG. 7 is a view similar to FIG. 6 showing the mold after movement to a quench unit of the system for tempering.

As illustrated in FIG. 6, termination of the vacuum drawn at the platen surface 36 releases the glass sheet G onto the mold 22 for forming which is performed by the operation of gravity in the illustrated system. Actuator 26 moves the mold 22 with the glass sheet supported thereby from the position of FIG. 6 below platen surface 36 to the quench unit 28 as illustrated in FIG. 7 between the upper and lower blastheads 30 and 32. Pressurized quenching gas supplied by the upper and lower blastheads 30 and 32 then rapidly cools the formed glass sheet to provide tempering thereof which improves its mechanical properties.

Figures 8, 9:
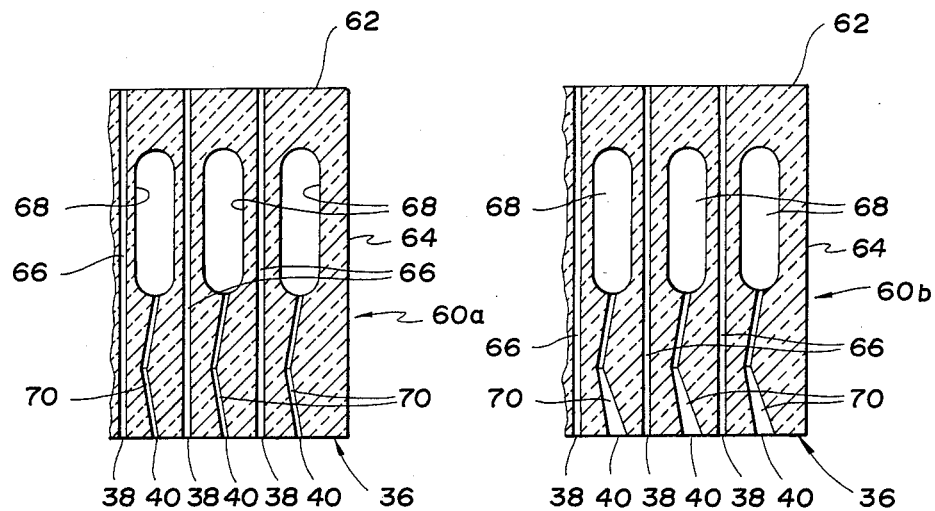
FIG. 8 is a view taken in the same direction as FIG. 4 through another embodiment of the platen wherein passages that feed the second set of holes are inclined to provide glass sheet conveyance along the platen.
FIG. 9 is a view similar to FIG. 8 of another embodiment of the platen wherein the inclined passages that feed the pressurized gas each have a conical shape.

Another embodiment of the platen 60a is illustrated in FIG. 8. This platen embodiment 60a has the first and second set of passages 66 and 70 reversed as compared to the previously described embodiment as far as which passages apply the vacuum and which supply the pressurized gas. The first set of vacuum passages 66 extend between the lower and upper surfaces of the platen and draw the vacuum at the first set of holes 38 from a vacuum applied at the upper surface of the platen. The second set of passages 70 have lower ends that communicate with the second set of holes 40 and have upper ends that are communicated with the elongated tunnels 66 through which the pressurized gas is supplied. As is apparent, somewhat modified blower and housing structure is necessary to draw the vacuum and supply the pressurized gas. The second set of gas supply passages 70 have lower extremities that are inclined in order to provide angled gas flow that provides conveyance of glass sheets along the downwardly facing platen surface 36 in the manner previously discussed. Upper ends of the gas supply passages 70 are inclined in an opposite direction and communicated with the elongated tunnels 68 which extend perpendicular to the direction of glass sheet conveyance along the platen. Such a construction permits the vacuum and pressurized gas holes 38 and 40 to be positioned in an alternating relationship aligned with each other along the direction of conveyance while providing the glass sheet conveyance by the angled gas flow as previously described.

With reference to FIG. 9, another embodiment of the platen 60b has the same construction as the platen embodiment 60a illustrated in FIG. 8 except that the lower ends of the inclined pressurized gas supply passages 70 have conical shapes for supplying the pressurized gas to the downwardly facing surface 36 of the platen. The conical shape of these lower passage ends extends from the junction of the angular passage portions for the full height of the lower ends of the passages.

Figures 10, 11:
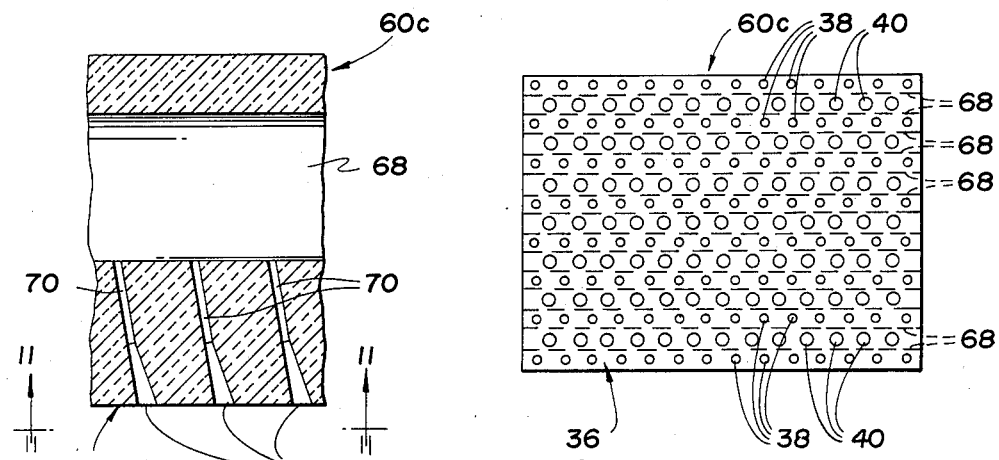
FIG. 10 is also taken in the same direction as FIG. 4 through another embodiment of the platen with inclined passages for feeding the pressurized gas but with elongated tunnels that feed the gas passages extending parallel to the direction of conveyance to facilitate the positioning of the first and second sets of holes and passages in the platen.
FIG. 11 is a bottom plan view illustrating the platen embodiment of FIG. 10.

With reference to FIGS. 10 and 11, another embodiment of the platen 60c has the elongated gas supply tunnels 68 extending parallel to the direction of conveyance as opposed to perpendicular thereto as with the platen embodiments illustrated in FIGS. 8 and 9. The second set of pressurized gas supply passages 70 have inclined configurations along their entire lengths as illustrated in FIG. 10 and have conical shapes at their lower ends with the passages essentially straight on the upstream side and with the upper and lower ends being slightly skewed with respect to each other on the downstream side. Thus, the lower conical passage ends are formed along an axis that is slightly skewed with respect to the central axis of the upper inclined ends of the passages 70. Orienting the elongated gas supply tunnels 68 to extend parallel to he direction of conveyance along which the passages 70 are inclined facilitates positioning of the vacuum passages that draw the vacuum at the holes 38 without any spacing problems between these passages and the gas supply tunnels 68.

Figure 12:
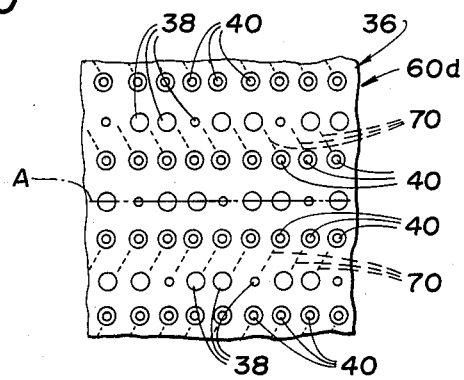
FIG. 12 is a bottom plan view of another platen embodiment wherein the second set of passages through which the pressurized gas is supplied are inclined toward a central axis as well as along the direction of conveyance to provide centered conveyance of glass sheets along the platen.

Another platen embodiment 60d is illustrated in FIG. 12. This platen embodiment 60d has the gas supply passages 70 provided with inclined components both along the direction of conveyance and toward a central axis A of conveyance with the latter inclined component being toward the central axis in opposite directions on opposite sides thereof so as to provide centering of a conveyed glass sheet.

Figure 13:
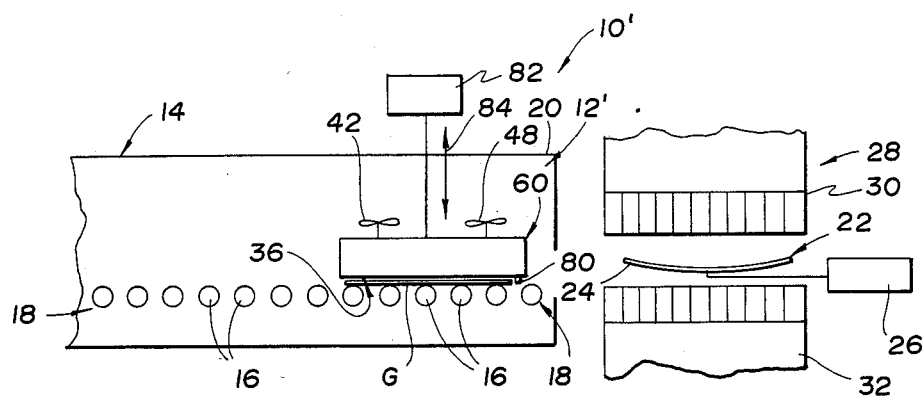
FIG. 13 is a schematic view of another forming and tempering system which includes topside transfer apparatus in accordance with the present invention and wherein the platen thereof is movable downwardly into proximity with a heating conveyor to receive a heated glass sheet therefrom in preparation for the forming operation.
Figure 14:
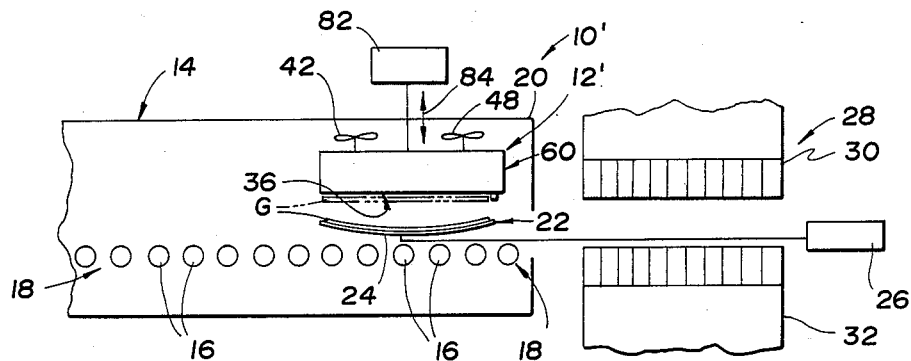
FIG. 14 is a view similar to FIG. 13 showing the transfer apparatus after upward movement thereof and release of the heated glass sheet onto curved mold for forming.
Figure 15:
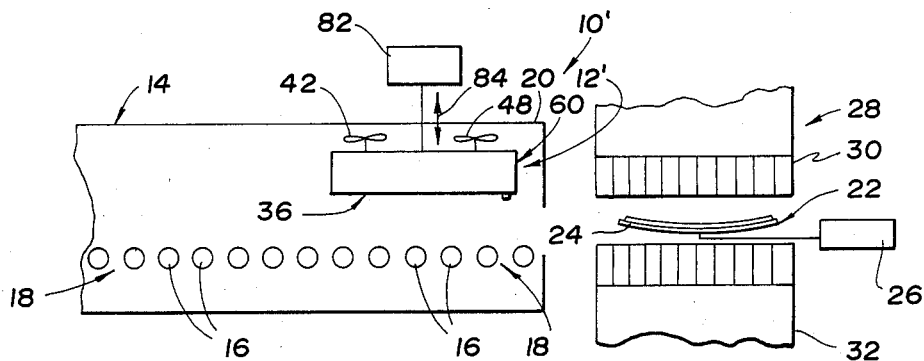
FIG. 15 is a view similar to FIG. 14 but showing the curved mold after movement to a quench unit for tempering of the formed glass sheet.

With reference to FIGS. 13 through 15, another embodiment of a glass sheet forming and tempering system is identified by 10' and has similar components to the system previously described such that like reference numerals are applied to like components and much of the previous description is applicable and need not be repeated. Heating conveyor 18 of the system 10' has the conveyor rolls 16 located below the topside transfer platen 60 which may have any of the constructions previously described. An actuator 82 moves the topside transfer platen 60 vertically as indicated by arrows 84.

During a cycle of operation of the system 10' the actuator 82 initially moves the platen 60 downwardly into proximity with the heating conveyor 18 as illustrated in FIG. 13 to facilitate the initial support of a heated glass sheet which is positioned by the locators 80 in the manner previously described. The ring mold 22 is then located at the quench unit 28 by its actuator 26. Thereafter, actuator 82 moves the platen 60 upwardly to the position of FIG. 14 with the heated glass sheet G supported thereby as shown by phantom line representation and then releases the glass sheet onto the ring mold 22 for forming by the operation of gravity to the mold shape as shown by solid line representation. Mold actuator 26 then moves the ring mold 22 from below the platen 60 as illustrated in FIG. 14 to the quench unit 28 as illustrated in FIG. 15. Quenching gas supplied by the upper and lower blastheads 30 and 32 of the quench unit 28 then provides rapid cooling of the formed glass sheet in order to provide tempering of the glass sheet. The actuator 82 then moves the platen downwardly to lift the next heated glass sheet as the next cycle commences.

Figure 16:
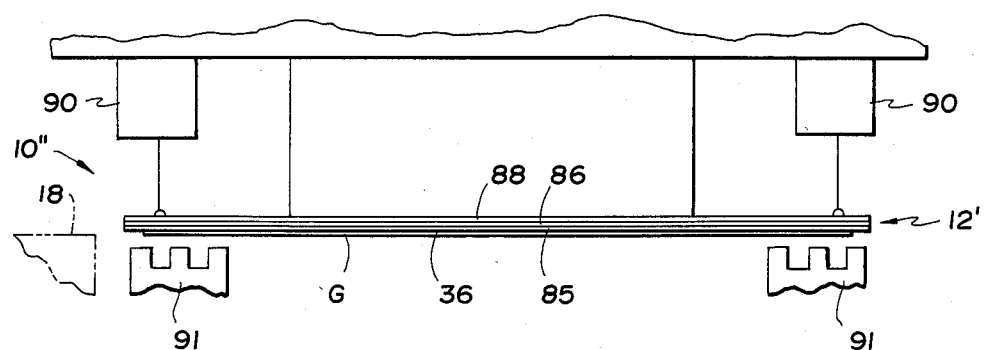
FIG. 16 is a schematic, elevational view of a glass sheet forming system including a deformable topside transfer platen that receives a flat glass sheet from a heating conveyor for forming.
Figure 17:
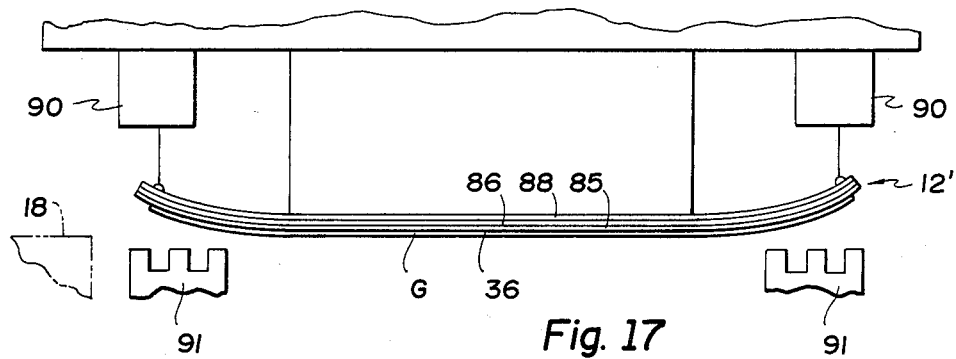
FIG. 17 is a view similar to FIG. 16 showing the deformable platen after forming of the glass sheet to a curved shape.

With reference to FIG. 16, another glass sheet processing system 10" includes topside transfer or handling apparatus 12' that receives a heated flat glass sheet from a schematically indicated heating conveyor 18 by either of the two modes of operation previously described or by any other suitable mode of transfer. System 10" includes a deformable platen 85 that defines the downwardly facing surface 36 at which a vacuum and pressurized gas are supplied to support the glass sheet G in a spaced relationship as previously described. Preferably, a first manifold 86 distributes the vacuum at the surface through a first set of openings or holes and a second manifold 88 distributes the flow of pressurized gas through a second set of openings or holes as previously described. One or more actuators as schematically illustrated by 90 move the deformable platen 85 from the planar position of FIG. 16 to the curved position of FIG. 17 to form the heated glass sheet supported thereby to the curved shape. The deformable platen 85 may have different constructions, one of which is a thin steel plate that is deformable and has openings which distribute the vacuum and pressurized gas. This forming is also preferably performed in a heated ambient and may utilize gas jet pumps 91 for supplying heated gas jets that assist in maintaining the glass sheet support on the deformable platen 85 during the forming operation. After the forming, the formed glass sheet may be annealed or tempered as necessary.

Figure 18:
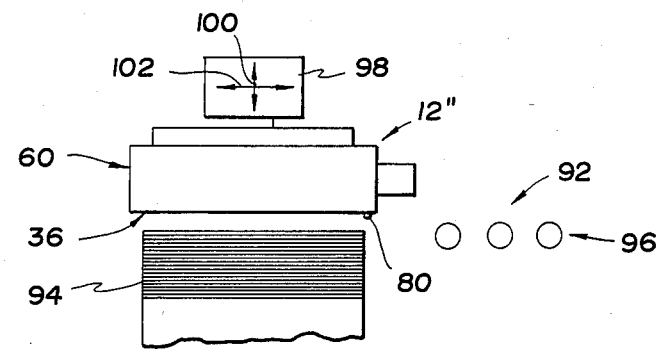
FIG. 18 is a schematic view of a glass sheet processing system which utilizes a topside loading platen for loading glass sheets onto a conveyor for processing.

With reference to FIG. 18, a loading system 92 is illustrated as including topside transfer apparatus 12" having a movable platen 60. The topside transfer apparatus 12" operates to transfer glass sheets from a stack 94 onto an associated conveyor 96 in preparation for processing. Suitable locators 80 on the surface 36 of the platen 60 provide accurate positioning of the glass sheet during the loading. An actuator 98 moves the platen 60 both vertically as shown by arrows 100 and horizontally as shown by arrows 102.

Each loading operation of the loading system 92 shown in FIG. 18 begins with downward movement of the platen 60 under the operation of actuator 98 such that the surface 36 is positioned in close proximity to the uppermost glass sheet of the stack 94. The glass sheet is then received by the application of vacuum and supply of pressurized gas at the surface 36 as previously described. Upward movement of platen 60 is then followed by horizontal movement to above the conveyor 96 whereupon the glass sheet is released by termination of the vacuum. This loading system has particular utility in loading glass sheets which have been painted on their upper surfaces with a paint that cures during heating on the conveyor 96 in preparation for further processing such as forming, tempering, or annealing, etc.

While the best modes for carrying out the invention have been described in detail, those familiar with the art to which this invention relates will recognize various alternative designs and embodiments for practicing the invention as defined by the following claims.

What is claimed is:

1. Glass sheet processing apparatus comprising: a horizontal heating conveyor having rolls for conveying glass sheets for heating; a stationary topside transfer platen having a downwardly facing planar surface located adjacent and extending away from the heating conveyor at an elevation just slightly above the rolls thereof to receive heated glass sheets from the heating conveyor; said transfer platen surface including a first set of holes through which a vacuum is drawn to support a heated glass sheet received from the heating conveyor; the transfer platen surface having a second set of holes through which pressurized gas is supplied to space the glass sheet from the surface; and a curved mold that is positioned below the trasfer platen to receive the heated glass sheet therefrom for forming.

2. Apparatus as in claim 1 wherein the stationary platen is positioned with its downwardly facing surface adjacent the heating conveyor without any overlapping therewith to receive the heated glass sheet from the heating conveyor.

3. Apparatus as in claim 2 wherein the transfer platen is made of fused silica that defines the downwardly facing planar surface, first and second sets of passages in the platen, and said first and second sets of passages having lower ends connected with the planar surface to provide the first and second sets of holes.

4. Apparatus as in claim 3 wherein the lower ends of the second set of passages are inclined to provide conveyance of the glass sheet along the planar surface.

5. Apparatus as in claim 4 wherein the platen includes elongated tunnels for supplying the pressurized gas, said elongated tunnels extending perpendicular to the direction of glass sheet conveyance along the planar surface, and the second set of passages having upper ends communicated with the elongated tunnels.

6. Apparatus as in claim 4 wherein the platen includes elongated tunnels for supplying pressurized gas, said elongated tunnels extending parallel to the direction of glass sheet conveyance along the planar surface, and the second set of passages having upper ends communicated with the elongated tunnels.

7. Apparatus as in claim 1, 2, or 3 wherein the second set of holes supplies heated pressurized gas of approximately the same temperature as the heated glass sheet to prevent undesired deformation thereof by the pressurized gas.

8. Apparatus as in claim 1, 2 or 3 further including a furnace in which the heating conveyor and transfer platen are located.

9. Apparatus as in claim 8 wherein the curved mold includes an actuator for providing movement thereof into the furnace to receive the glass sheet and for thereafter moving the glass sheet out of the furnace for cooling of the glass sheet.

10. Apparatus as in claim 1, 2 or 3 further including a quench unit having upper and lower opposed blastheads for supplying cooling gas to opposite surfaces of the formed glass sheet to provide cooling thereof that tempers the glass sheet.

11. Apparatus as in claim 1, 2 or 3 further including locators for positioning the glass sheet on the downwardly facing planar surface of the transfer platen.

12. Glass sheet forming apparatus comprising: a furnace; a horizontal heating conveyor having rolls for conveying glass sheets within the furnace for heating; a stationary topside transfer platen located within the furnace adjacent the heating conveyor and having a downwardly facing planar surface extending away from the heating conveyor and being located just slightly above the rolls of the heating conveyor to receive heated glass sheets therefrom; the transfer platen surface including a first set of holes through which a vacuum is drawn to support a heated glass sheet received from the heating conveyor; a second set of holes in the transfer platen surface for supplying pressurized gas heated to approximately the same temperature as the heated glass sheet to maintain a spaced relationship between the glass sheet and the platen surface without unintended deformation; and a curved mold for receiving the heated glass sheet from the transfer platen for forming.

13. Glass sheet forming apparatus comprising: a furnace; a horizontal heating conveyor having rolls for conveying glass sheets within the furnace for heating; a stationary topside transfer platen located within the furnace adjacent the heating conveyor; said transfer platen being made of fused silica and having a downwardly facing planar surface extending away from the heating conveyor and being located just slightly above the rolls of the heating conveyor to receive heated glass sheets therefrom; the transfer platen surface including a first set of holes through which a vacuum is drawn to support a heated glass sheet received from the heating conveyor; a second set of holes in the transfer platen surface for supplying pressurized gas heating to approximately the same temperature as the heated glass sheet to maintain a spaced relationship between the glass sheet and the platen surface without unintended deformation; and a curved mold for receiving the heated glass sheet from the transfer platen for forming.

14. Glass sheet forming and tempering apparatus comprising: a furnace; a horizontal heating conveyor having rolls for conveying glass sheets within the furnace for heating; a stationary topside transfer platen located within the furnace adjacent the heating conveyor; said transfer platen being made of fused silica and having a downwardly facing planar surface extending away from the heating conveyor and being located just slightly above the rolls of the heating conveyor to receive heated glass sheets therefrom; the transfer platen surface including a first set of holes through which a vacuum is drawn to support a heated glass sheet received from the heating conveyor; a second set of holes in the transfer platen surface for supplying pressurized gas heated to approximately the same temperature as the heated glass sheet to maintain a spaced relationship between the glass sheet and the platen surface without unintended deformation; a curved mold for receiving the heated glass sheet from the transfer platen for forming; and a quench station for tempering the formed glass sheet.

15. Glass sheet forming and tempering apparatus comprising: a furnace; a roller conveyor having rolls for conveying glass sheets within the furnace for heating; a stationary topside transfer platen located within the furnace adjacent the roller conveyor; said transfer platen being made of fused silica and having a downwardly facing planar surface extending away from the roller conveyor without any overlapping therewith and being located at an elevation slightly higher than glass sheets conveyed on the rolls of the roller conveyor to receive heated glass sheets therefrom; said transfer platen surface including a first set of holes through which a vacuum is drawn to support a heated glass sheet received from the roller conveyor; a second set of holes in the transfer platen surface for supplying pressurized gas heated to approximately the same temperature as the heated glass sheet to maintain a spaced relationship between the glass sheet and the platen surface without unintended deformation; a curved mold for receiving the heated glass sheet from the transfer platen for forming; and a quench station for tempering the formed glass sheet.

* * * * *